United States Patent [19]

Kubo

[11] Patent Number: 5,664,077
[45] Date of Patent: Sep. 2, 1997

[54] THREE-DIMENSIONAL GRAPH DISPLAYING SYSTEM

[75] Inventor: Katsunori Kubo, Hiroshima, Japan

[73] Assignee: NEC Corporation, Tokyo, Japan

[21] Appl. No.: 301,000

[22] Filed: Sep. 6, 1994

[30] Foreign Application Priority Data

Sep. 6, 1993 [JP] Japan ................. 5-220761

[51] Int. Cl.$^6$ ................................. G06T 15/00
[52] U.S. Cl. ............................ 345/421; 345/425
[58] Field of Search ......................... 395/103, 121, 395/102, 108, 119, 123, 125, 137

[56] References Cited

U.S. PATENT DOCUMENTS

| | | | |
|---|---|---|---|
| 4,660,157 | 4/1987 | Beckwith et al. | 395/121 |
| 4,985,854 | 1/1991 | Wittenburg | 395/121 |
| 5,086,496 | 2/1992 | Mulmuley | 395/121 |
| 5,201,035 | 4/1993 | Stytz et al. | 395/121 X |
| 5,268,994 | 12/1993 | Keskes | 395/121 |
| 5,283,859 | 2/1994 | Quarendon et al. | 395/121 X |
| 5,381,518 | 1/1995 | Drebin et al. | 395/121 X |

*Primary Examiner*—Phu K. Nguyen
*Assistant Examiner*—Cliff N. Vo
*Attorney, Agent, or Firm*—Foley & Lardner

[57] ABSTRACT

A three-dimensional graph display system for displays M×N in number of two-dimensional graph data in a three-dimensional graph appearance. The system determines one of angular ranges derived by dividing 360° into a given number of equal angular width ranges, in which a rotation angle designating a viewpoint of the three-dimensional graph is involved and selecting one of reference rotation angles set for respective angular range, corresponding to the determined angular range, selects one of a plurality of reading out orders established with respect to respective reference rotation angles for reading out the height data of the individual graph image at back side at earlier timing than that of the individual graph image at front side, corresponding to the selected reference rotation angle, as the order for reading out graph image height from M×N displays of a two-dimensional array of the graph image height storage means, reads out the graph image height data according to the selected reading out order and generates plotting data of the three-dimensional graph by arranging the read out graph image height data in a plotting pattern constituted of M×N of grids on a plotting memory in a predetermined plotting order. The plotting data is read out and output as the three dimensional graph.

11 Claims, 7 Drawing Sheets

THREE-DIMENSIONAL GRAPH DISPLAYING SYSTEM

BACKGROUND OF THE INVENTION

1. Field of the Invention

The present invention relates to a three-dimensional graph plotting system. More specifically, the invention relates to a three-dimensional graph displaying system capable of plotting and outputting a three-dimensional graph by processing two-dimensional data at high speed.

2. Description of the Related Art

Conventionally, such a three-dimensional graph displaying system is incorporated in an information processing system as a statistic application program and frequently used as one means for visually displaying data. For the portion which is hidden and not visible as displayed on the output device, such a three-dimensional displaying system has the capability to display such hidden data by rotating the whole graph.

In order to realize the function of plotting the three-dimensional graph with rotation, it is typical to perform a polar coordinates transformation process of the plotting data or a hidden line control process (erasing process of the plot line seen at a further back side) internally in the program.

Namely, in the polar coordinates transformation process, polar coordinate values of respective ones of individual polygonal pole or cylindrical three-dimensional graph images forming the three-dimensional graph are temporarily stored in a memory and are re-calculated depending upon the rotation angle. In the case of the polygonal pole three-dimensional graph image, polar coordinate values for all eight corners are required to be stored in the memory. On the other hand, in the hidden line control process, the positional relationship of the individual polygonal pole or cylindrical three-dimensional graph image with respect to other three-dimensional graph images in terms of which should be seen at the front and the plot line at the back side position is erased.

Since the above-mentioned conventional three-dimensional graph plotting system requires the three-dimensional polar coordinates transforming process or the hidden line control process after rotation of the coordinates, the program becomes special and complicated. As a result, the execution program becomes extensive, causing a lowering of speed in the plotting process or makes maintenance difficult. Also, in the three-dimensional coordinates transformation process, since the amount of plot data becomes large, the work memory and so forth or the memory required in the system becomes large.

SUMMARY OF THE INVENTION

It is an object of the present invention to provide a three-dimensional graph displaying system which facilitates plotting of the three-dimensional graph or rotation thereof by data processing on a two-dimensional coordinate system without performing the three-dimensional coordinate transformation process with respect to the rotational angle or a hidden line control process.

Another object of the present invention is to provide a three-dimensional graph displaying system which can make a program simple and compact and facilitates maintenance.

A further object of the invention is to provide a three-dimensional graph displaying system which can be realized with a small amount of system resources by eliminating the necessity for a three-dimensional coordinate transformation process and therefore make unnecessary the work memory and so forth used for temporarily storing a large amount of plot data.

According to one aspect of the invention, a three-dimensional graph display system for displaying two-dimensional graph data in a three-dimensional graph appearance, comprises:

graph image height storage means for storing only height data of each individual graph image forming the three-dimensional graph in a two dimensional array;

reference rotation angle selecting means for determining one of angular ranges derived by dividing 360° into a given number of equal angular width ranges, in which a rotation angle designating a viewpoint of the three-dimensional graph is involved and selecting one of reference rotation angles set for respective angular range, corresponding to the determined angular range;

data reading out control means for selecting one of a plurality of reading out orders established with respect to respective reference rotation angles for reading out the height data of the individual graph image at back side at earlier timing than that of the individual graph image at front side, corresponding to the selected reference rotation angle as the order for reading out the graph image height data from the graph image height storage means;

plotting control means for reading out the graph image height data according to the selected reading out order and generating a plotting data of the three-dimensional graph by arranging the read out graph image height data in a plotting pattern in a plotting memory in a predetermined plotting order; and output means for reading out the plotting data from the plotting memory and outputting the three dimensional graph after completion of plotting of all graph image height data read out from the graph height storage means in the plotting memory.

According to another aspect of the invention, a three-dimensional graph display system for displaying M×N in number of two-dimensional graph data in a three-dimensional graph appearance, comprises:

graph image height storage means for storing only height data of each individual graph image forming the three-dimensional graph in a two dimensional array, corresponding to M×N in number of graph data;

reference rotation angle selecting means for determining one of angular ranges derived by dividing 360° into a given number of equal angular width ranges, in which a rotation angle designating a viewpoint of the three-dimensional graph is involved and selecting one of reference rotation angles set for respective angular range, corresponding to the determined angular range;

data reading out control means for selecting one of a plurality of reading out orders established with respect to respective reference rotation angles for reading out the height data of the individual graph image at back side at earlier timing than that of the individual graph image at front side, corresponding to the selected reference rotation angle, as the order for reading out graph image height from M×N of a two-dimensional array of the graph image height storage means;

plotting control means for reading out the graph image height data according to the selected reading out order and generating plotting data of the three-dimensional graph by arranging the read out graph image height data in a plotting pattern constituted of M×N of grids in a plotting memory in a predetermined plotting order; and output means for reading out the plotting data from the plotting memory and outputting the three dimensional graph after completion of plotting of all graph image height data read out from the graph height storage means in the plotting memory.

The plotting control means may set a plotting order for plotting graph images in overlaying manner the back side to the front side as the predetermined plotting order for plotting the read out graph image height data in the plotting patterns in the plotting memory.

In the preferred construction the angular ranges are defined by dividing 360° into four and respectively set in a range of 315° to 45°, 45° to 135°, 135° to 225° and 225° to 315°, and respective reference rotation angles of respective angular ranges are set at 0°, 90°, 180° and 270°.

The three-dimensional graph displaying system may further comprise storage means for storing a coordinate of an origin of a plotting pattern of the plotting memory for plotting the three-dimensional graph, unit lengths of grids forming the plotting pattern in X-axis and Y-axis directions, the number of grids and the plotting order for plotting the graph image height data, as initial information for plotting the three-dimensional graph in the plotting memory.

According to a further aspect of the invention, a three-dimensional graph display system for displaying two-dimensional graph data in a three-dimensional graph appearance, comprises:

graph image height storage means for storing only height data of each individual graph image forming the three-dimensional graph in a two dimensional array;

reference rotation angle selecting means for selecting one of reference rotation angles designating the direction of viewpoint to the three-dimensional graph;

data reading out control means for selecting one of a plurality of reading out orders established with respect to respective reference rotation angles for reading out the height data of the individual graph image at back side at earlier timing than that of the individual graph image at front side, corresponding to the selected reference rotation angle as the order for reading out the graph image height data from the graph image height storage means;

plotting control means for reading out the graph image height data according to the selected reading out order and generating a plotting data of the three-dimensional graph by arranging the read out graph image height data in a plotting pattern on a plotting memory in a predetermined plotting order; and output means for reading out the plotting data from the plotting memory and outputting the three dimensional graph after completion of plotting of all graph image height data read out from the graph height storage means in the plotting memory.

According to a still further aspect of the invention, a three-dimensional graph display system for displaying two-dimensional graph data in a three-dimensional graph appearance, comprises:

graph image height storage means for storing only height data of each individual graph image forming the three-dimensional graph in a two dimensional array;

reference rotation angle selecting means for determining one of angular ranges derived by dividing 360° into a given number of equal angular width ranges, in which a rotation angle designating a viewpoint of the three-dimensional graph is involved and selecting one of reference rotation angles set for respective angular range, corresponding to the determined angular range;

data reading out control means for selecting one of a plurality of reading out orders established with respect to respective reference rotation angles for reading out the height data of the individual graph image at back side at earlier timing than that of the individual graph image at front side, corresponding to the selected reference rotation angle as the order for reading out the graph image height data from the graph image height storage means;

plotting control means for reading out the graph image height data according to the selected reading out order and generating a plotting data of the three-dimensional graph by arranging the read out graph image height data in a plotting pattern on a plotting memory in a predetermined plotting order, the plotting control means setting a plotting order for plotting graph images in overlaying manner from back side to the front side as the predetermined plotting order for plotting the read out graph image height data in the plotting pattern on the plotting memory; and output means for reading out the plotting data from the plotting memory and outputting the three dimensional graph after completion of plotting of all graph image height data read out from the graph height storage means in the plotting memory.

Other objects, advantages and features of the present invention will become apparent from the detailed description given herebelow.

BRIEF DESCRIPTION OF THE DRAWING

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

Figure 1:
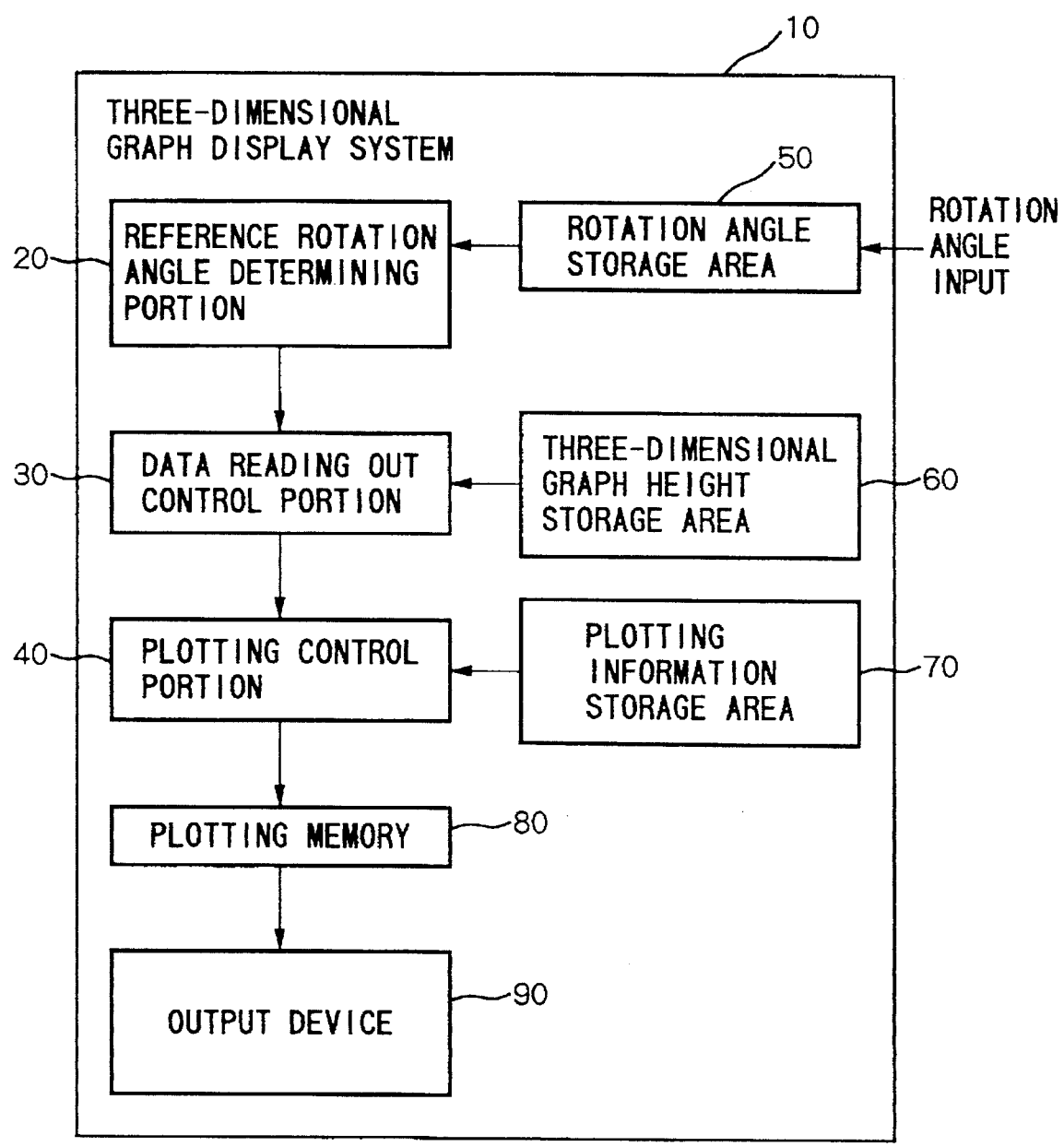
FIG. 1 is a block diagram showing an embodiment of a three-dimensional graph displaying system according to the present invention.

FIG. 1 is a block diagram showing a construction of one embodiment of the three-dimensional graph displaying system according to the present invention. In FIG. 1, the disclosed embodiment of the three-dimensional graph displaying system 10 is a system for three-dimensionally plotting and outputting the two-dimensional graph data in the form of a perspective view. The three-dimensional graph displaying system 10 comprises a reference rotational angle determining portion 20, a data read out portion 30, a plotting control portion 40, a rotation angle storage area 50, a three-dimensional graph image height storage area 60, an initial plotting information storage area 70, an image plotting memory 80 and an output device 90.

The rotational angle storage area 50 is a region for storing a rotational angle input by an operator for designating the angle to show the image of the objective three-dimensional graph and thus stores an arbitrary angle from 0° to 360°.

The three-dimensional graph image height storage portion 60 is a region for storing height data (unit graph image height data) of the three-dimensional graph (unit three-dimensional graph image) of polygonal pole (square or rectangular parallelpiped, triangular pole) configuration or cylindrical configuration forming the three-dimensional graph displayed on a virtual scale plane of M rows×N columns as an array "A" of M rows×N columns.

The reference rotation angle determining portion 20 is means for determining one of predetermined angular ranges, in which a rotation angle input and stored in the rotation angle storage area 50 is involved and selecting a reference rotation angle corresponding to the angular range including the stored rotation angle. In the embodiment shown, the reference rotation angle determining portion 20 determines one of four angular ranges derived by dividing 360° into four equal angular width ranges, in which the rotation angle input and stored in the rotation angle storage area 50 is involved. In the embodiment shown, the angular ranges are defined, respectively, as a range greater than or equal to 315° and less than 45°, a range greater than or equal to 45° and less than 135°, a range greater than or equal to 135° and less than 225° and a range greater than or equal to 225° and less than 315°. Four respective angular ranges, 0°, 90°, 180° and 270° are assigned as reference rotation angles.

Accordingly, when the stored rotation angle involved is within the range of greater than or equal to 315° and less than 45° ($315° \leq \phi < 45°$), 0° becomes the reference rotation angle. Similarly, when the stored rotation angle involved is within the range of greater than or equal to 45° and less than 135° ($45° \leq \phi < 135°$), 90° becomes the reference rotation angle, when the stored rotation angle involved is within the range of greater than or equal to 135° and less than 225° ($135° \leq \phi < 225°$), 180° becomes the reference rotation angle, and when the stored rotation angle is involved within the range of greater than or equal to 225° and less than 315° ($225° \leq \phi < 315°$), 270° becomes the reference rotation angle.

The angular range with respect to the reference rotation angle is the rotation angle range, in which the positional relationship, i.e. front side and back side, between the unit three-dimensional graph images at any view point within the range, is held unchanged. For instance, when two unit three-dimensional graph images are positioned at front and back sides respectively at the view point of 0°, relative positions of the three-dimensional images at respective of front side and back side are held unchanged as long as the view point stays within the range of greater than or equal to 315° and less than 45°.

The data reading out control portion 30 is means for setting the order for reading out the unit graph height data from the graph image height storage area 60 on the basis of the reference rotation angle selected by the reference rotation angle determining portion 20. In the data reading out control portion 30, orders of reading out data of the unit three-dimensional graph image heights are set with respect to the four reference rotation angles (0°, 90°, 180°, 270°).

The plotting control portion 40 reads out the unit three-dimensional graph image height data from the three-dimensional image height storage area 60 according to the order of reading out set by the data reading out control portion 30. Then, the plotting control portion generates display data of the graph on the basis of the read out unit three-dimensional graph image height data and plotting information set in the initial information storage area 70 and plots the three-dimensional graph in the image memory 80.

The initial information storage area 70 stores initial information for plotting the three-dimensional graph in the image memory 80. In initial information storage area 70, origin coordinates of a virtual scale plane for displaying the three-dimensional graph, unit lengths (dx, dy) in x-axis and y-axis directions between grid points formed on the virtual scale plane, the number of grid points (value of M×N) forming the virtual plane, and an order of plotting (direction and rule for plotting) upon displaying the unit graph image on the virtual scale plane, are stored.

The output device 90 is a CRT device or a printer device for making the three-dimensional image plotted in the image memory 80 visible.

Figure 2:
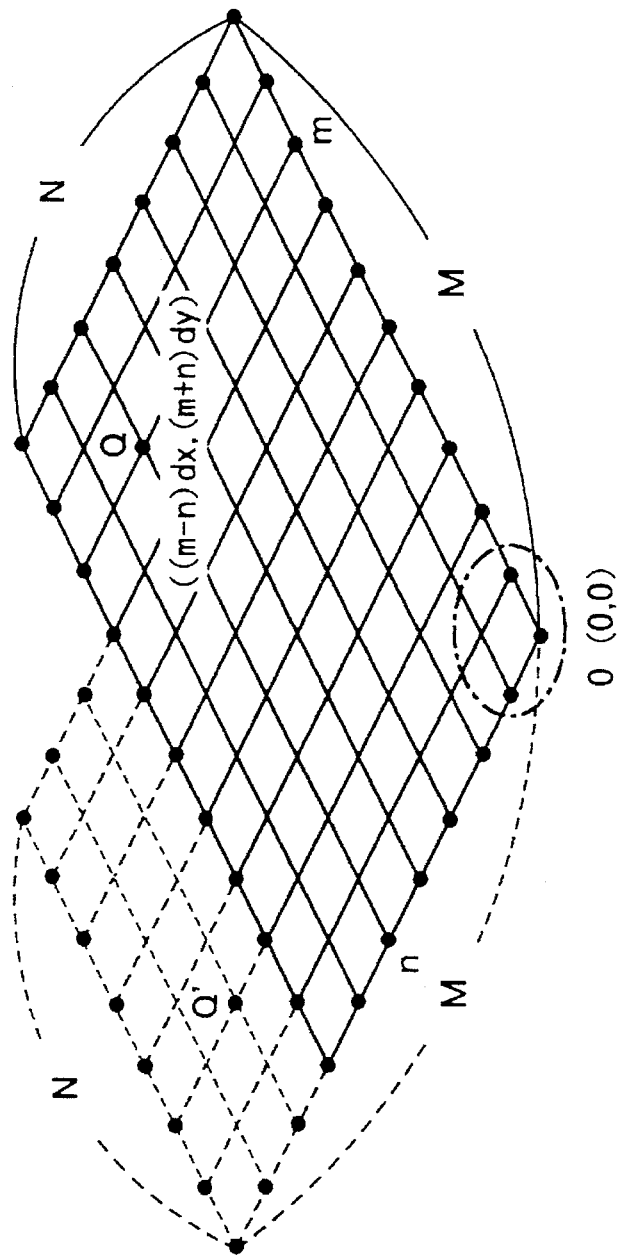
FIG. 2 is an illustration showing one example of an image pattern on a virtual scale plane to be employed in three-dimensional graph plotting in the disclosed embodiment of FIG. 1.

FIG. 2 shows an image pattern of the virtual scale plane (virtual plotting pattern) for plotting the three-dimensional image. As shown, the virtual scale plane consists of M×N (both of M and N are positive integers greater than or equal to 1).

Here, the image patterns represent the image pattern of the virtual scale plane at every reference rotation angle of 0°, 90°, 180° and 270°. When the reference rotation angle is 0° and 180°, the pattern becomes as illustrated by the solid line in FIG. 2. As can be seen, at the reference rotation angles 0° and 180°, the plotting patterns become identical. When the reference rotation angle is 90° and 270°, the pattern becomes as illustrated by the broken line in FIG. 2. As can be seen, at the reference rotation angles 90° and 270°, the plotting patterns become identical. Accordingly, the four kinds of three-dimensional graphs at the reference rotation angles 0°, 90°, 180° and 270° are plotted with two kinds of plotting patterns.

Here, the coordinates of each grid point forming the virtual scale plane can be derived by employing the unit lengths dx and dy in the X-axis direction and Y-axis direction of the grid points. It should be noted that the unit lengths dx and dy are preliminarily stored in the initial information storage area 70.

For example, the coordinates of a point Q defined by intersection of grid lines m and n is expressed by ((m+n)dx, (m+n)dy). The point Q' rotated over 90° from the point Q is expressed as ((n−m)dx, (m+n)dy) as expressed by using m and n.

Each of the three-dimensional graph images representing the data value in the three-dimensional graph (hereinafter referred to as "unit three-dimensional graph image") is plotted by the plotting data generated from the combination of the plotting position data consisting of the coordinates at the intersection of the grid lines on the virtual scale plane and the unit graph height data indicative of the height of the unit three-dimensional graph image. Then, with the plotting data of the unit three-dimensional graph image for the M×N of grid points on the virtual scale plane, plotting of the whole three-dimensional graph is completed.

At this time, the data reading out control portion 30 determines the order for reading out the unit graph image height data from the three-dimensional graph image height storage area 60 corresponding to the plotting position on the virtual scale plane, on the basis of the reference rotation angle. The plotting control portion 40 generates the plotting data of the three-dimensional graph seen from the reference rotation angle on the basis of the unit graph height data read out from the three-dimensional graph image height storage area 60 and the plotting position on the virtual scale plane.

Figure 4:
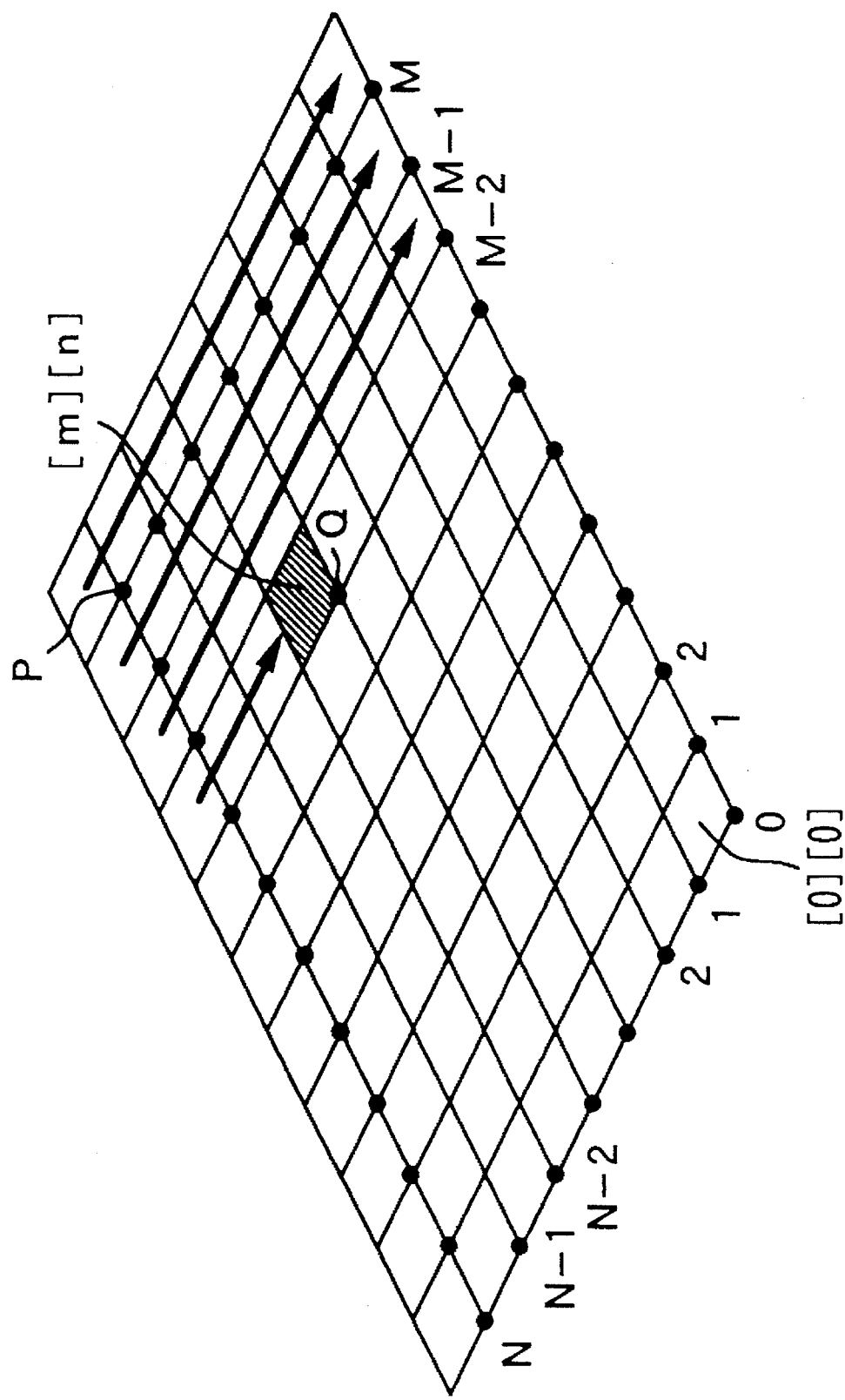
FIG. 4 is an explanatory illustration showing an order of plotting of a unit three-dimensional graph on the scale plane when rotational angles are at 0° and 180°.

FIG. 4 is an illustration showing one example of the order of plotting of the unit three-dimensional graph image on the virtual scale plane shown in FIG. 2.

When the graph is to be plotted on the virtual scale plane on which (M+1) of grid lines along X axis and (N+1) of grid lines along Y axis are provided with respect to the origin (0, 0) of the virtual scale plane, by constantly plotting the unit three-dimensional graph image overlaying in a direction from the point P (Mdx, Ndy) to the origin (0, 0) as shown by the arrow, it becomes possible to plot the graph image in a form of a three-dimensionally projected image without performing the hidden line control process.

Here, the point (Mdx, Mdy) has the coordinates of the plotting start position of the graph, which is determined by the plotting control portion 40 on the basis of the values of M and N stored in the initial information storage area 70, unit length dx and dy, and the plotting order. On the other hand, the unit three-dimensional graph image plotted by taking the plotting start point (Mdx, Mdy) as plotting coordinates, is plotted in the range (grid) defined by the coordinates (Mdx, Mdy), ((M+1)dx, Ndy), (Mdx, (N+1)dy) and ((M+1)dx, (N+1)dy) The grid position on the virtual scale plane of the unit three-dimensional graph image at this time is expressed by [M], [N].

Accordingly, the unit three-dimensional graph image plotted out by taking the origin (0, 0) as the plotting coordinates, the grid position of the unit three-dimensional graph image is expressed by [0], [0]. On the other hand, the unit three-dimensional graph image plotted by taking the intersection Q((m−n)dx, (m+n)dy) of the mth grid line and nth grid line on the virtual scale plane as the plotting coordinates, is expressed as [m], [n] on the basis of the grid position. In FIG. 4, at the reference rotation angle 0°, the order for plotting of the respective individual unit three-dimensional graph image may be expressed as follows on the basis of the grid position.

[M] [N] → [M] [N−1] → ••• [M] [0] → [M−1] [N] → [M−1] [N−1]

→ ••• → [M−1][0] → ••• → [m][n] → ••• → [0][N] → [0][N−1] → ••• [0][0]

This order is referred to as "plotting order A".

Concerning the plotting order of the unit three-dimensional graph image, the order is identical to the order A in the case where the reference rotation angle is 180°.

Figure 5:
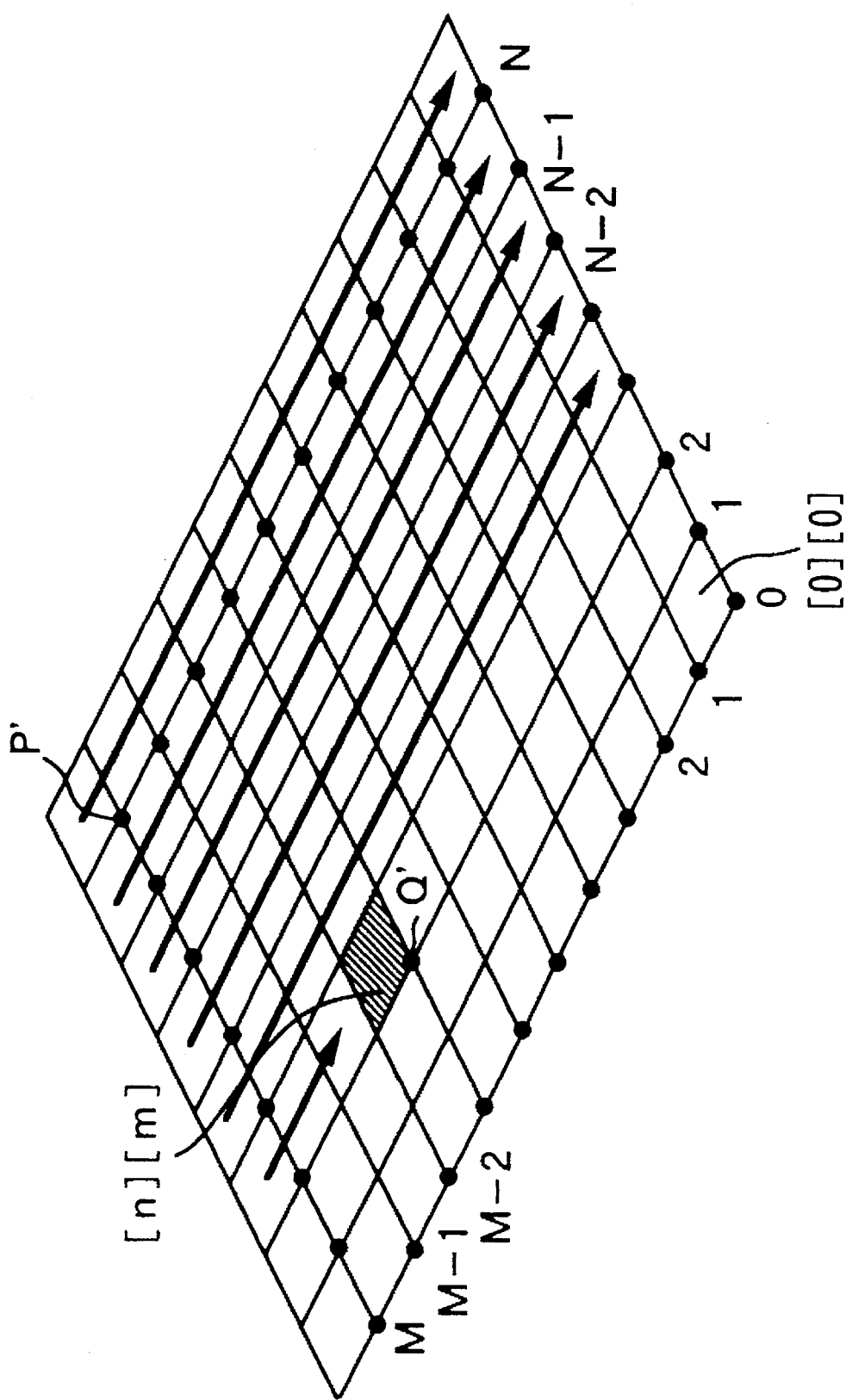
FIG. 5 is an explanatory illustration showing an order of plotting of a unit three-dimensional graph on the scale plane when rotational angles are at 90° and 270°.

On the other hand, FIG. 5 shows the condition where the virtual scale plane is rotated 90° from the position of FIG. 4. Here, in comparison with the case of FIG. 4 where the rotation angle is 0°, the number of the grid line in the X-axis direction is N+1 and the number of the grid line in the Y-axis is M+1, in which the values of M and N are reversed from that of FIG. 4. Here, the plotting start point becomes P'(Ndx, Mdy), and is plotted toward the same direction as FIG. 4.

The unit three-dimensional graph image plotted by taking point Q' ((n−m)dx, (n+m)dy) rotated from the intersection Q for 90° as plotting coordinates, is expressed by [n][m]. In FIG. 5, in the reference rotation angle 90°, the plotting order of the individual unit three-dimensional graph image is expressed as follows on the basis of the grid position.

[N] [M] → [N] [M−1] → ••• [N] [0] → [N−1] [M] → [N−1] [M−1]

→ ••• → [N−1][0] → ••• → [n][m] → ••• → [0][M] → [0][M−1] → ••• [0][0]

This order will be referred to as "plotting order B".

Concerning the plotting order of the unit three-dimensional graph image, even at the reference rotation angle 270°, the plotting order is the identical to the order B.

Here, replacing N with M' and replacing M with N' of the plotting order B, the order becomes

[M'] [N'] → [M'] [N'−1] → ••• [M'] [0] → [M'−1] [N'] → [M'−1] [N'−1] → ••• → [M'−1][0] → ••• → [m'][n'] → ••• → [0][N'] → [0][N'−1] → ••• [0][0]

From this, it will be appreciated that plotting is performed in the same order as the order A. Accordingly, in the case of the reference rotation angle 90°, the above-mentioned plotting order B is obtained by mutually switching the values of M and N with respect to the plotting order in the case of the reference rotation angle 0°.

Concerning the plotting order on the virtual scale plane, the plotting start position and the plotting terminating position at respective reference rotation angles can be easily calculated based on the origin of the virtual scale plane, the unit lengths dx and dy and the values of M and N.

Namely, the plotting order of the three-dimensional graph on the virtual scale plane with respect to each reference rotation angle is made constant in the direction and order by mutually switching the values of M and N and only differentiating the plotting start position and terminating position.

Since the plotting control portion 40 of the three-dimensional graph displaying system 10 performs plotting by sequentially overlaying the unit three-dimensional graph image according to the predetermined plotting order as set forth above, irrespective of the rotation angle as set forth above, plotting of the three-dimensional graph can be performed without performing the hidden line control process.

Namely, as set forth above, plotting of the unit three-dimensional graph image is performed from the most back side plotting position (point P in FIG. 4 and point P' in FIG.

5) on the virtual scale plane in the constant direction (toward lower right direction of FIGS. 4 and 5). Thus, in the virtual scale plane, the unit three-dimensional graph images are plotted from the back side to the front side by overlapping the images in order.

It should be noted that, in FIGS. 4 and 5, the plotting direction is to the lower right direction in the drawings. However, since the direction is only required to be back side to front side, the direction can also be to the lower left direction in the drawings.

Next, a discussion will be provided for the order of reading out the unit graph image height data set by the data reading out control portion 30.

Figure 6:
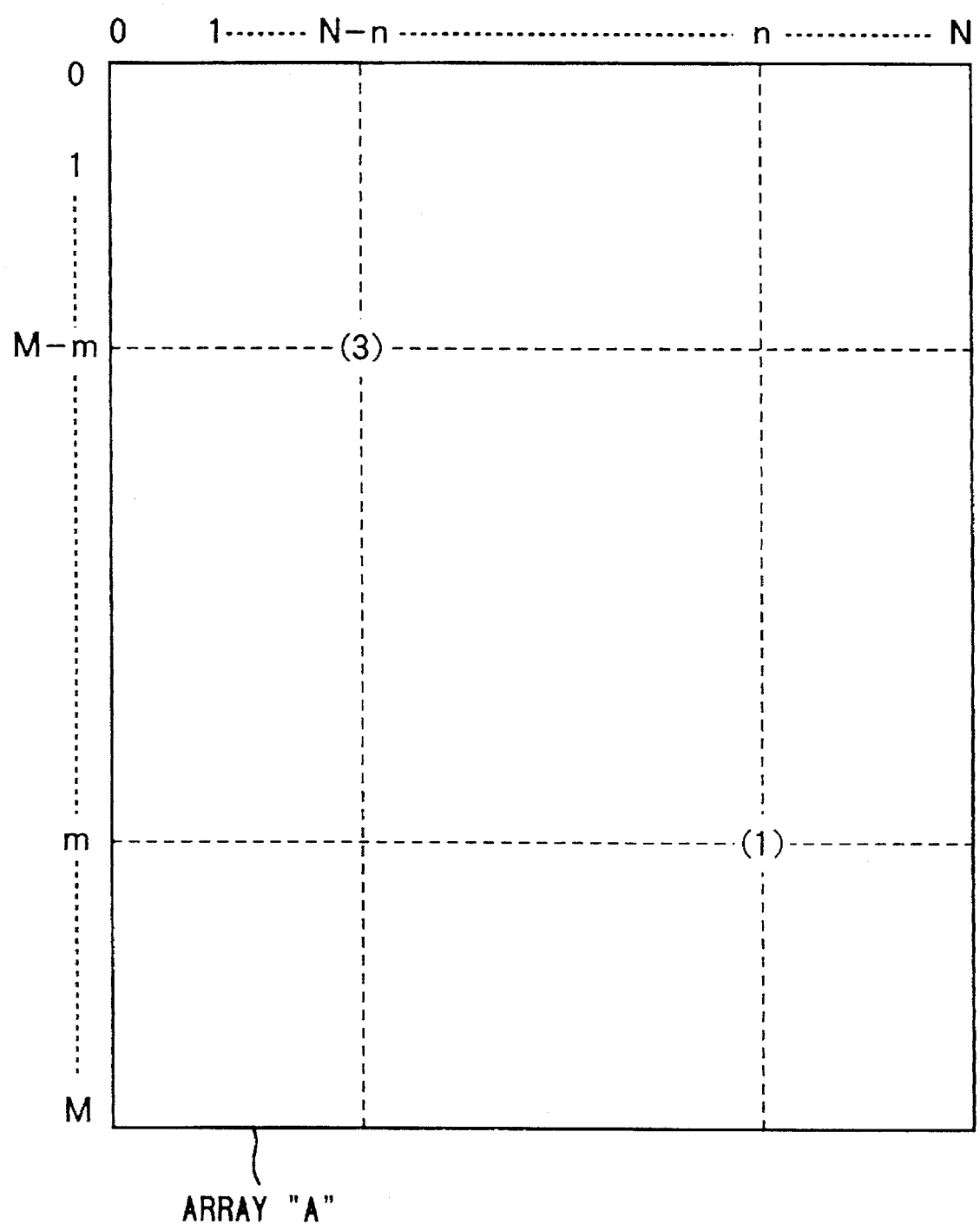
FIG. 6 is an illustration showing a storage array of the three-dimensional graph height data in a three-dimensional graph height storage area in the disclosed embodiment.

FIG. 6 shows an array pattern of the unit graph image height data stored in the graph height storage area 60. The unit graph image height data is stored in a form of a two-dimensional array of M rows×N columns. Each item of unit graph image height data is assumed to be stored in the direction of O to M and O to N. Here, the storage position of the unit graph image height data in the array A is illustrated corresponding to the grid positions on the virtual scale plane of FIGS. 4 and 5. Namely, the unit graph image height data stored in M row, N column of the array A is expressed as A[M][N].

When the reference rotation angle is 0°, for plotting the unit three-dimensional graph image at the plotting position [m][n] represented by the intersection Q in FIG. 4, the unit graph image height data is stored in position (1) of the graph height storage area 60 of FIG. 6, namely in the position of array A[m][n].

Here, when the three-dimensional graph is plotted on the virtual scale plane in the case where the reference rotation angle is 0°, the order for reading out the unit graph image height data from the array A of the graph height storage area 60 is set as follows:

A[M][N] → A[M][N−1] → ••• A[M][0] → ••• →A[m][n] → •••

→ A[0][N] → A[0][N−1] → ••• A[0][0]

This order will be referred to as reading out order (1).

Here, when plotting is to be performed for the state where the three-dimensional graph is seen as completely opposite to that plotted at the reference rotation angle 0°, in other words, when 180° is selected as the reference rotation angle, for plotting the unit three-dimensional graph image at the plotting position [m][n] pointed to by the intersection Q in FIG. 4 the data at the position (3) of the graph height storage area 60, namely, the unit graph image height data stored in the array A[M+m][N+n] is read out.

Here, if the three-dimensional graph is to be plotted at the reference rotation position of 180°, the order for reading out the unit graph image height data from the array A of the graph height storage area 60 is set as follows:

A[0][0] → A[0][1] → ••• A[0][N] → A[M−m][N−n] ••• →

A[M][0] → A[M][1] → ••• A[M][N]

This reading out order is referred to as order (3).

On the other hand, when 90° is selected as the reference rotation angle, for plotting the unit three-dimensional graph image at the plotting position [m][n] pointed to by the intersection Q' in FIG. 5, the unit graph image height data to be read out is the data in the position (1) of FIG. 6, namely the unit graph image height data stored in [m][n]. However, the array of the grid points to be plotted on the virtual scale plane is varied, when the three-dimensional graph is plotted on the virtual scale plane shown in FIG. 5 at the reference rotation angle 90°, the order for reading out the unit graph image height data from the array A of the graph height storage area 60 is set as following, differently from the reading out order (1) set forth above.

A[M][0] → A[M−1][0] →••• A[0][0] → ••• A[m][n] ••• →

A[M][N] → A[M−1][N] → ••• A[0][N]

This order will be referred to as order (2).

Here, when plotting is to be performed for the state where the three-dimensional graph is seen as completely opposite to that plotted at the reference rotation angle 90°, in other words, when 270° is selected as the reference rotation angle, for plotting the unit three-dimensional graph image at the plotting position [n][m] pointed to by the intersection Q' in FIG. 5, the data at the position (3) of the graph height storage area 60, namely, the unit graph image height data stored in the array A[M−m][N−n] is read out.

Here, plotting the three-dimensional graph on the virtual scale plane at the reference rotation angle 180°, the order for reading out the unit graph image height data from the array A of the graph storage area is set as follows.

A[0][N] → A[1][N] → ••• A[M][N] → ••• A[M−m][N−n] ••• →

A[0][0] → A[1][0] → ••• A[1][0]

This order of reading out will be hereafter referred to as order (4).

Thus, for the graph plotting position on the virtual scale plane, a rotatable plotting function of a pseudo-three-dimensional graph can be realized. Namely, since only two-dimensional data (plotting position and unit graph image height data) instead of three-dimensional data, is employed for plotting the three-dimensional graph, a complicated polar coordinates transformation process and a hidden line control process become unnecessary.

Figure 7:
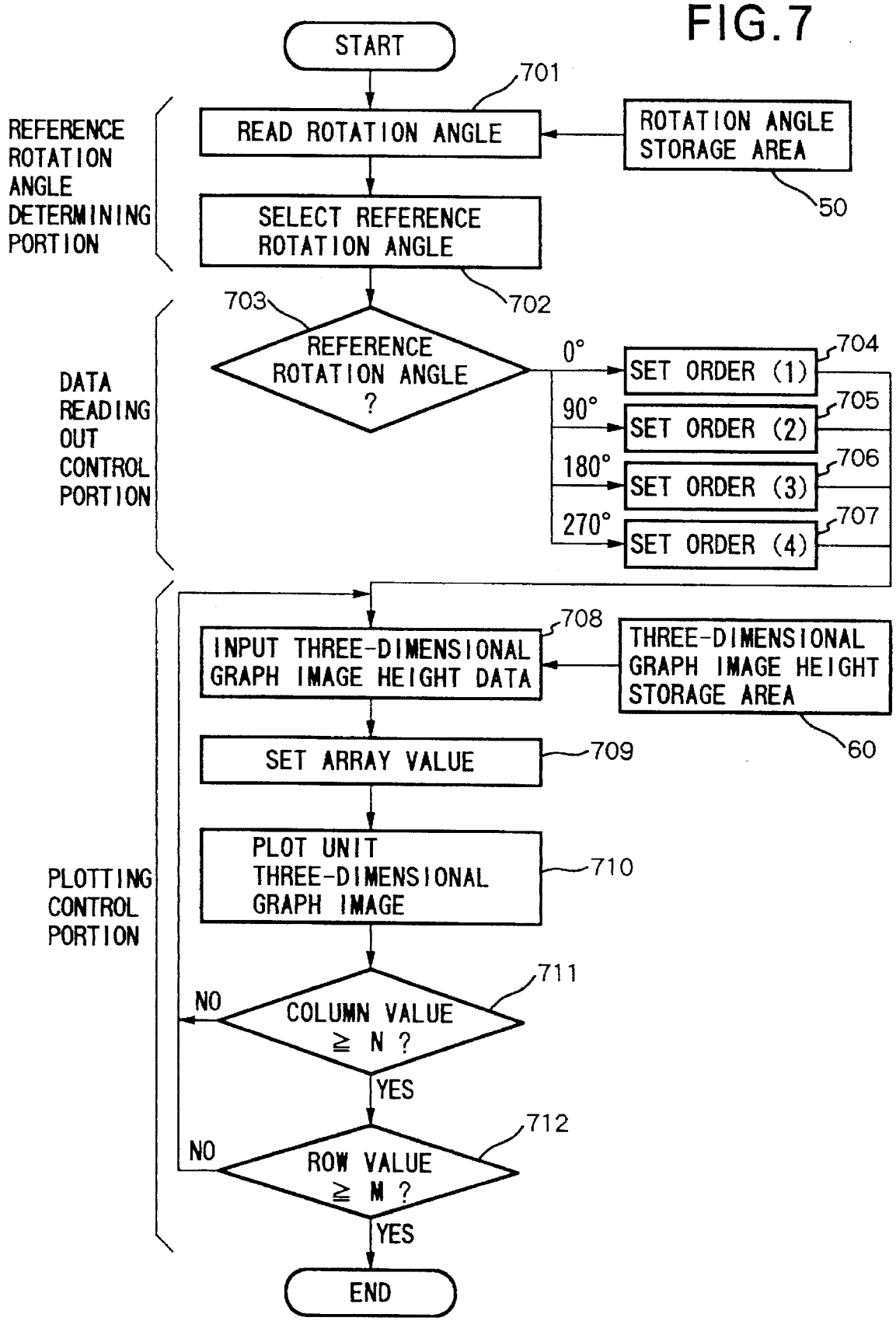
FIG. 7 is a flowchart explaining the graph plotting process in the disclosed embodiment of the three-dimensional graph displaying system.

The content of the process by the three-dimensional graph displaying system 10 of FIG. 1 will be discussed with reference to a flowchart illustrated in FIG. 7. Here, in the rotation angle storage area 50, a desired rotation angle "φ" is input and stored. It is assumed that the unit graph image height data is stored in the graph height storage area 60 in a form of a two-dimensional array A of M rows×N columns, as shown in FIG. 6.

At first, the reference angle determining portion 20 reads out the rotation angle "φ" input from the rotational angle storage area 50 ( step 701). When the read out rotation angle "φ" is 315°≦φ<45°, 0° is selected as the reference rotation angle. Similarly, when the read out rotation angle "φ" is 45°≦φ<135°, 90° is selected as the reference rotation angle; when the read out rotation angle "φ" is 135°≦φ<225°, 180° is selected as the reference rotation angle; and when the read out rotation angle "φ" is 225°φ<315°, 270° is selected as the reference rotation angle (step 702).

Next, the data reading out control portion 30 checks the value of the reference rotation angle selected by the reference rotation angle determining portion. If the reference rotation angle is "0°", the reading out order of the unit graph image height data from the graph height storage area 60 is set at the order (1) as discussed with respect to FIG. 5. If the reference rotation angle is "90°", the reading out order of the unit graph image height data from the graph height storage area 60 is set at the order (2). If the reference rotation angle is "180°", the reading out order of the unit graph image height data from the graph height storage area 60 is set at the order (3). If the reference rotation angle is "270°", the reading out order of the unit graph image height data from the graph height storage area 60 is set at the order (4). (step 703 and steps 704 to 707)

Then, the plotting control portion 40 reads out the unit graph image height data stored in the array A of the graph height storage area 60 one by one according to the reading out order set at one of the steps 704 to 707 (step 708). Here, every time the unit graph image height data is read out from the array A, the values of the row and column of the read out unit graph image height data are counted.

Figure 3:
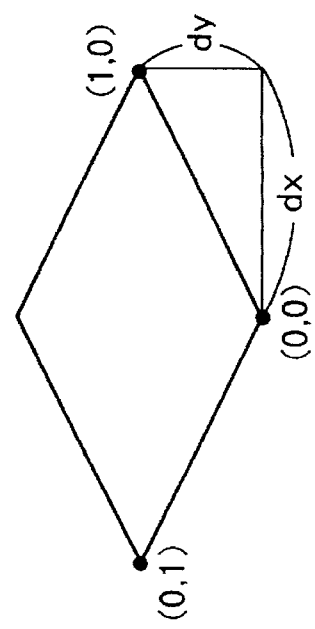
FIG. 3 is an enlarged illustration showing a part of the virtual scale plane of FIG. 2.

Next, on the basis of the plotting order (plotting order A or B) on the virtual scale plane depending upon the reading out order of the unit graph image height data and the reference rotation angle, the plotting position of the read out unit graph image height data on the virtual scale plane shown in FIGS. 3 and 4 is determined (step 710).

At this time, when the input rotation angle stored in the rotation angle storage area is different from the reference rotation angle, at step 710, the plotting control portion 40 generates the plotting data of the unit three-dimensional graph image in the condition where the grid configuration on the virtual scale plane and left and right proportion of the planes of the unit three-dimensional graph image are varied by varying the values of the unit lengths dx and dy according to the input rotation angle. The plotting data thus generated is plotted in the image memory 80. By this, the plotting data corresponding to the input rotation angle can be generated. When the input rotation angle is equal to the reference rotation angle, this process becomes unnecessary.

Until all of the unit graph image height data stored in the array A of the graph height storage area 60 are read out, namely, until the counter value of the column of the unit graph image height data reaches N and the counter value of the row reaches M, the processes through the steps 708 to 710 are repeated (steps 711, 712).

When all of the unit three-dimensional graph images of M rows×N columns are plotted on the image memory 80, the output device reads out the plotting data in the image memory 80 and outputs the three-dimensional graph. Namely, when the output device is a display device, the three-dimensional graph is displayed on a display screen. On the other hand, when the output device is a printer, the three-dimensional graph is printed.

Figure 8:
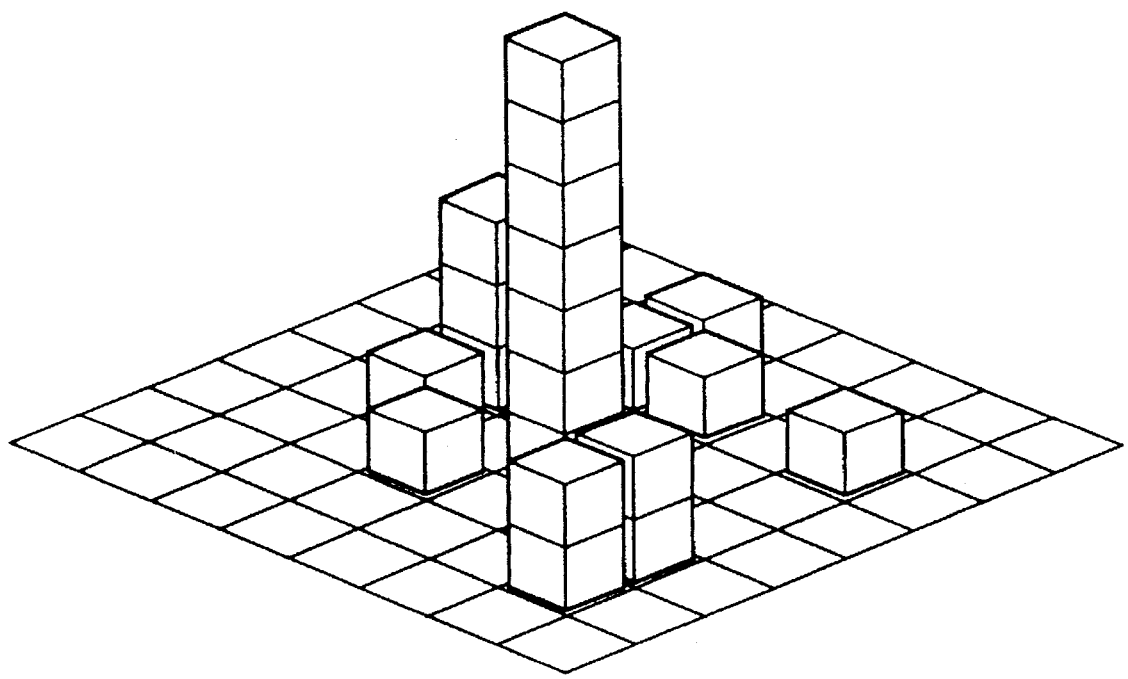
FIG. 8 is an illustration showing the three-dimensional graph plotted at a reference rotational angle "0°" by the disclosed embodiment of the three-dimensional graph displaying system.
Figure 9:
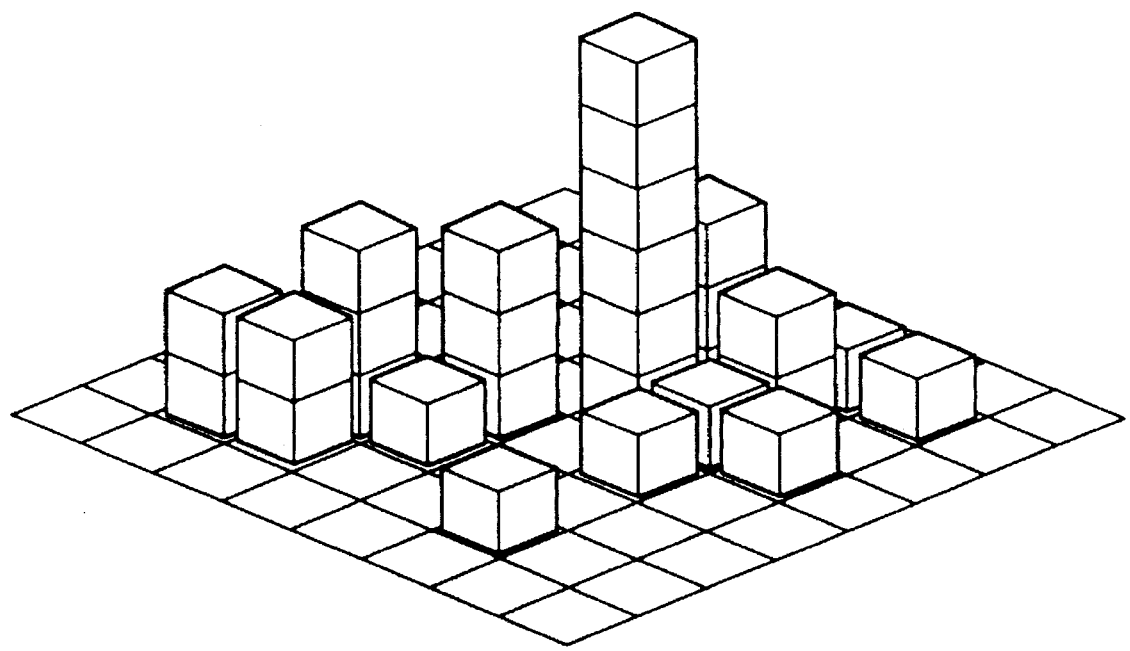
FIG 9 is an illustration showing the three dimensional graph plotted by rotating the three-dimensional graph over "90°".

FIG. 8 shows an example of the three-dimensional graph plotted at the reference rotation angle "0°" by the embodiment shown of the three-dimensional graph displaying system 10. Also, FIG. 9 shows an example of the graph, in which the three-dimensional graph of FIG. 8 is rotated over 90°.

As set forth above, in the embodiment shown of the three-dimensional graph displaying system, after determining the viewpoint of the graph to be plotted, the reading out order of the unit graph image height data stored in the graph height storage area 60 is determined. Then, on the basis of the unit graph image height data read out according to the reading out order, the plotting data of the unit three-dimensional graph image is generated and plotted in the image memory 80. Accordingly, it becomes unnecessary to provide a work memory for temporarily storing the coordinate values for plotting. Therefore, the program can be simplified and compact and may achieve a high speed plotting process.

It should be noted that, in the foregoing embodiment, on the basis of the arbitrary rotation angle input to the rotation angle storage area 50 by the operator, the reference rotation angle is determined by the reference rotation angle determining portion 20. However, by limiting the rotation angles to be input by the operator to the reference rotation angles, the reference rotation angle determining portion 20 is only required to determine the selected reference rotation angle. Therefore, the determining process (step 702) becomes unnecessary. Also, by limiting the rotation angle as set forth above, the process for generating the plotting data of the unit three-dimensional graph image in the condition where the grid configuration and the left and right proportion of the unit three-dimensional graph image are varied by varying the unit lengths dx and dy of the virtual scale plane, becomes unnecessary.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within the scope encompassed and equivalents thereof with respect to the features set out in the appended claims.

What is claimed is:

1. A three-dimensional graph display system for displaying a two-dimensional graph data in a three-dimensional graph appearance, comprising:

graph image height storage means for storing only height data of each individual graph image forming the three-dimensional graph in a two dimensional array;

reference rotation angle selecting means for determining one of angular ranges derived by dividing 360° into a given number of equal angular width ranges, in which a rotation angle designates a viewpoint of the three-dimensional graph and selecting one of reference rotation angles set for a respective angular range, corresponding to the determined angular range;

data reading out control means for selecting one of a plurality of reading out orders established with respect to respective reference rotation angles for reading out said height data of the individual graph image at back side at earlier timing than that of the individual graph image at front side, corresponding to said selected reference rotation angle as the order for reading out said graph image height data from said graph image height storage means;

plotting control means for reading out said graph image height data according to the selected reading out order and generating plotting data of the three-dimensional graph by arranging the read out graph image height data in a plotting pattern in a plotting memory in a predetermined plotting order; and output means for reading out the plotting data from said plotting memory and outputting the three dimensional graph after completion of plotting of all graph image height data read out from said graph height storage means in said plotting memory.

2. A three-dimensional graph displaying system as set forth in claim 1, wherein said plotting control means sets a plotting order for plotting graph images in overlaying manner from the back side to the front side as the predetermined plotting order for plotting the read out graph image height data in the plotting pattern in the plotting memory.

3. A three-dimensional graph displaying system as set forth in claim 1, wherein said angular ranges are defined by dividing 360° into four and respectively set in a range of 315° to 45°, 45° to 135°, 135° to 225° and 225° to 315°, and respective reference rotation angles of respective angular ranges are set at 0°, 90°, 180° and 270°.

4. A three-dimensional graph displaying system as set forth in claim 1, which further comprises storage means for storing a coordinate of an origin of a plotting pattern of the plotting memory for plotting the three-dimensional graph, unit lengths of grids forming said plotting pattern in X-axis and Y-axis directions, number of grids and the plotting order for plotting said graph image height data, as initial information for plotting the three-dimensional graph in said plotting memory.

5. A three-dimensional graph display system for displaying M×N in number of two-dimensional graph data in a three-dimensional graph appearance, comprising:

graph image height storage means for storing only height data of each individual graph image forming the three-dimensional graph in a two dimensional array, corresponding to M×N in number of graph data;

reference rotation angle selecting means for determining one of angular ranges derived by dividing 360° into a given number of equal angular width ranges, in which a rotation angle designates a viewpoint of the three-dimensional graph and selecting one of reference rotation angles set for a respective angular range, corresponding to the determined angular range;

data reading out control means for selecting one of a plurality of reading out orders established with respect to respective reference rotation angles for reading out said height data of the individual graph image at back side at earlier timing than that of the individual graph image at front side, corresponding to said selected reference rotation angle, as the order for reading out graph image height from M×N of two-dimensional array of said graph image height storage means;

plotting control means for reading out said graph image height data according to the selected reading out order and generating plotting data of the three-dimensional graph by arranging the read out graph image height data in a plotting pattern constituted of M×N of grids in a plotting memory in a predetermined plotting order; and output means for reading out the plotting data from said plotting memory and outputting the three dimensional graph after completion of plotting of all graph image height data read out from said graph height storage means in said plotting memory.

6. A three-dimensional graph displaying system as set forth in claim 5, wherein said plotting control means sets a plotting order for plotting graph images in overlaying manner from back side to the front side as the predetermined plotting order for plotting the read out graph image height data in the plotting pattern in the plotting memory.

7. A three-dimensional graph displaying system as set forth in claim 5, wherein said angular ranges are defined by dividing 360° into four and respectively set in a range of 315° to 45°, 45° to 135°, 135° to 225° and 225° to 315°, and respective reference rotation angles of respective angular ranges are set at 0°, 90°, 180° and 270°.

8. A three-dimensional graph displaying system as set forth in claim 5, which further comprises storage means for storing a coordinate of an origin of a plotting pattern in the plotting memory for plotting the three-dimensional graph, unit lengths of grids forming said plotting pattern in X-axis and Y-axis directions, number of grids and the plotting order for plotting said graph image height data, as initial information for plotting the three-dimensional graph in said plotting memory.

9. A three-dimensional graph display system for displaying two-dimensional graph data in a three-dimensional graph appearance, comprising:

graph image height storage means for storing only height data of each individual graph image forming the three-dimensional graph in a two dimensional array;

reference rotation angle selecting means for selecting one of reference rotation angles designating a direction of viewpoint to the three-dimensional graph;

data reading out control means for selecting one of a plurality of reading out orders established with respect to respective reference rotation angles for reading out said height data of the individual graph image at back side at earlier timing than that of the individual graph image at front side, corresponding to said selected reference rotation angle as the order for reading out said graph image height data from said graph image height storage means;

plotting control means for reading out said graph image height data according to the selected reading out order and generating plotting data of the three-dimensional graph by arranging the read out graph image height data in a plotting pattern in a plotting memory in a predetermined plotting order; and output means for reading out the plotting data from said plotting memory and outputting the three dimensional graph after completion of plotting of all graph image height data read out from said graph height storage means in said plotting memory.

10. A three-dimensional graph displaying system as set forth in claim 9, which further comprises storage means for storing a coordinate of an origin of a plotting pattern of the plotting memory for plotting the three-dimensional graph, unit lengths of grids forming said plotting pattern in X-axis and Y-axis directions, number of grids and the plotting order for plotting said graph image height data, as initial information for plotting the three-dimensional graph in said plotting memory.

11. A three-dimensional graph display system for displaying a two-dimensional graph data in a three-dimensional graph appearance, comprising:

graph image height storage means for storing only height data of each individual graph image forming the three-dimensional graph in a two dimensional array;

reference rotation angle selecting means for determining one of angular ranges derived by dividing 360° into a given number of equal angular width ranges, in which a rotation angle designates a viewpoint of the three-dimensional graph selecting one of reference rotation angles set for a respective angular range, corresponding to the determined angular range;

data reading out control means for selecting one of a plurality of reading out orders established with respect to respective reference rotation angles for reading out said height data of the individual graph image at back side at earlier timing than that of the individual graph image at front side, corresponding to said selected reference rotation angle as the order for reading out said graph image height data from said graph image height storage means;

plotting control means for reading out said graph image height data according to the selected reading out order and generating plotting data of the three-dimensional graph by arranging the read out graph image height data in a plotting pattern in a plotting memory in a predetermined plotting order, said plotting control means setting a plotting order for plotting graph images in overlaying manner from back side to the front side as the predetermined plotting order for plotting the read out graph image height data in the plotting pattern on the plotting memory; and output means for reading out the plotting data from said plotting memory and outputting the three-dimensional graph after completion of plotting all graph image height data read out from said graph height storage means in said plotting memory.

* * * * *